United States Patent [19]
Boehmer

[11] Patent Number: 5,129,426
[45] Date of Patent: Jul. 14, 1992

[54] TUBE MOUNTED CHECK VALVE
[75] Inventor: Dennis A. Boehmer, Xenia, Ohio
[73] Assignee: Vernay Laboratories, Inc., Yellow Springs, Ohio
[21] Appl. No.: 699,271
[22] Filed: May 13, 1991
[51] Int. Cl.⁵ ............................................. F16K 15/14
[52] U.S. Cl. ..................................... 137/854; 137/798
[58] Field of Search ...................... 137/843, 854, 798

[56] References Cited
U.S. PATENT DOCUMENTS

| | | |
|---|---|---|
| 97,485 | 12/1869 | Dawson . |
| 209,975 | 11/1878 | Morey . |
| 1,778,092 | 10/1930 | Tallman . |
| 2,130,053 | 9/1938 | White . |
| 2,372,629 | 3/1945 | Nelson . |
| 2,483,572 | 10/1949 | Cater . |
| 2,579,855 | 12/1951 | Pockel ............................ 137/854 |
| 3,435,839 | 4/1969 | Elder . |
| 3,451,067 | 6/1969 | Jordan . |
| 3,530,880 | 9/1970 | Hune . |
| 3,601,152 | 8/1971 | Kenworthy ..................... 137/843 |
| 3,739,801 | 6/1973 | Rudolph . |
| 3,812,542 | 5/1974 | Shiley . |
| 3,858,246 | 1/1975 | Milo . |
| 4,257,445 | 3/1981 | Cook et al. . |
| 4,513,784 | 4/1985 | Farrand ........................... 137/854 |
| 4,556,084 | 12/1985 | Frawley . |
| 4,646,772 | 3/1987 | Bergsma . |
| 4,749,003 | 6/1988 | Leason . |
| 4,751,940 | 6/1988 | Bergsma et al. . |
| 4,753,262 | 6/1988 | Bergsma . |
| 4,762,149 | 8/1988 | Pickl ................................ 137/854 X |
| 4,907,616 | 3/1990 | Bergsma . |
| 4,960,153 | 10/1990 | Bergsma . |
| 4,966,199 | 10/1990 | Ruschke . |

Primary Examiner—Robert G. Nilson
Attorney, Agent, or Firm—Biebel & French

[57] ABSTRACT

A one-way valve is provided for permitting fluid in one direction through the valve and preventing fluid flow in an opposite direction. The valve includes a plastic valve body having inwardly extending spokes for supporting a central hub member. The hub member supports an umbrella valve regulator member formed of a resilient material. A cap member is provided for attachment to the valve body wherein the cap member extends over and surrounds the resilient umbrella valve member. The cap member includes radially extending passages whereby fluid flowing into a first end of the valve may flow through the spoke portions to open the umbrella valve and pass out of the valve through the radially extending passages.

12 Claims, 4 Drawing Sheets

TUBE MOUNTED CHECK VALVE

BACKGROUND OF THE INVENTION

The present invention relates generally to a flow regulation apparatus, and more particularly, to a one-way check valve which will open and close at very low differential pressures in order to prevent flow in a first direction and to allow flow in a second direction.

Automotive fuel systems typically incorporate a one-way check valve on the end of a fuel return tube within the vehicle gas tank. In a typical automotive fuel system, fuel is pumped through a supply tube to a fuel chamber at the engine in quantities in excess of that required by the engine. The excess fuel is returned to the fuel tank by way of the fuel return line and the one-way valve at the fuel tank end of the return line insures that if suction should be applied to the return line from the engine, or if the line should be damaged in the event of an accident, fuel will be prevented from flowing in reverse flow through the return line.

Several different check valves have been used to prevent back flow through the return line, such as a duckbill valve attached to the end of the tube. While this valve effectively controls flow of fuel through the tube, under certain conditions it may produce an undesirable noise as the fuel is returned to the fuel tank.

In another prior art valve, a plastic disk is retained within a cage attached to the end of the return tube and the disk moves toward the end of the tube to seal off the end of the tube when a vacuum is applied to the tube. However, such a valve structure does not insure that a complete seal will be provided at the end of the tube and may not respond quickly to prevent back flow under all operating conditions.

Accordingly, there is a need for a one-way check valve which may be easily attached to the end of a fuel return tube and which will permit quiet forward flow of fluid through the tube.

SUMMARY OF THE INVENTION

The present invention is a valve for attachment to the end of a fluid conveying tube wherein fluid flow is prevented in a first direction into the tube and fluid flow is permitted in a second direction out of the tube and through the valve.

The valve includes a valve body defining a central longitudinal axis of the valve and includes a tube receiving first end and a regulator second end located at a longitudinally opposite end of the valve.

The regulator second end includes radially inwardly extending spoke portions and a hub portion supported by the spoke portions. The spoke portions define flow apertures for permitting fluid to flow from the first end and through the second end of the valve.

A flow control member in the form of a resilient umbrella valve extends over the flow apertures and includes a stem which extends from the umbrella valve through the hub portion. A radially outer surface of the umbrella valve engages an annular sealing surface located at the second end of the valve body and the umbrella member is in a normally closed position for preventing fluid flow through the valve.

A flange extends radially outwardly from the annular sealing surface at the second end of the valve. The flange includes a support surface which is coplanar with the sealing surface and an annular lip which extends parallel to the longitudinal axis of the valve from the second toward the first end of the valve.

A cap member is provided attached to the valve body and includes a disk shaped top portion and a plurality of angularly spaced finger members which extend substantially perpendicularly from the top portion. The finger members each include a support block for engaging the support surface to maintain the top portion in spaced relation to the valve member and the sealing surface. The finger members further include a radially inwardly extending detent member for engaging an edge of the annular lip to hold the cap member in position on the valve body.

A radially extending fluid flow passage is defined between adjacent ones of the support blocks and between the top portion and the support surface such that fluid flow from the first to the second end of the valve may pass between the spokes and cause the umbrella valve member to open, and thereafter pass radially outwardly from the valve through the radially extending fluid passages.

In addition, the valve is provided with means for limiting the inward movement of a tube inserted into the first end of the valve comprising radially inwardly extending ledge portions. The ledge portions are formed as part of the spoke portions and are axially spaced from the hub portion in a direction toward the first end of the valve body.

Other objects and advantages of the invention will be apparent from the following description, the accompanying drawings and the appended claims.

DETAILED DESCRIPTION OF THE PREFERRED EMBODIMENT

Figure 1:
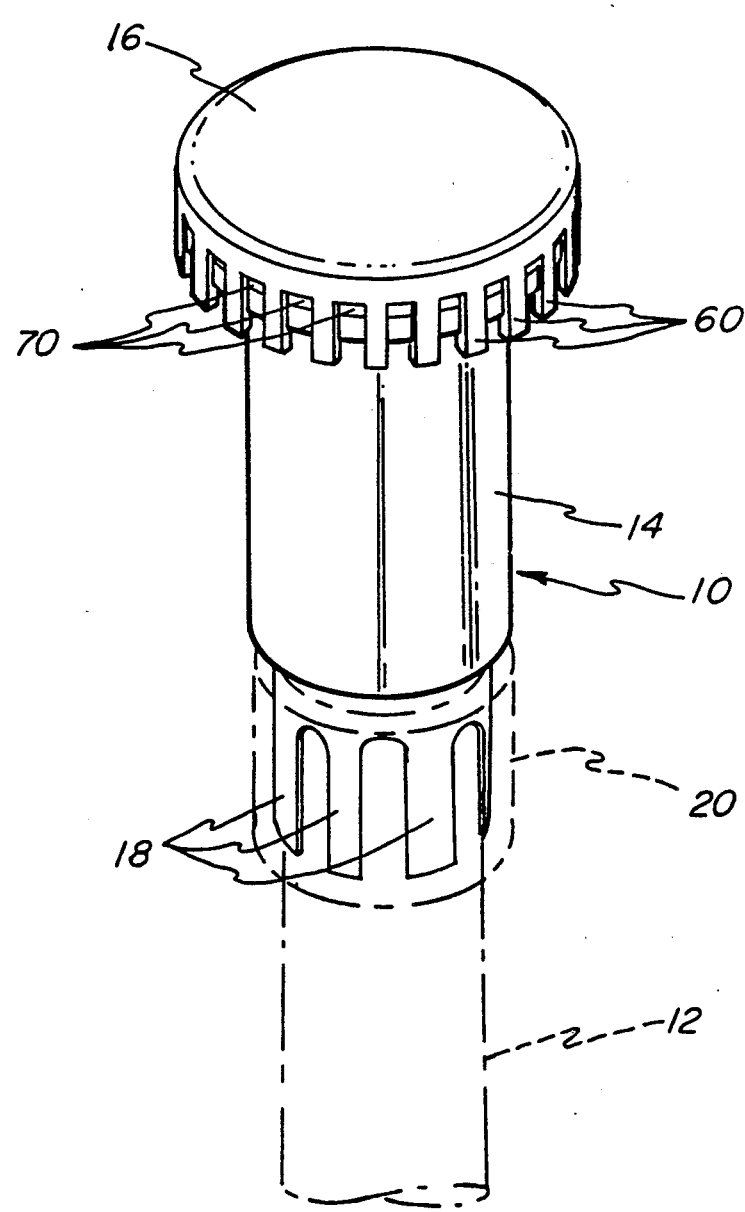
FIG. 1 is a perspective view of the valve of the present invention in position on a tube.

Referring to FIG. 1, the valve of the present invention is shown attached to the end of a tube 12. The valve includes a valve body 14 and a cap member 16 positioned over and substantially surrounding one end of the valve body 14. In addition, a plurality of spaced legs 18 are located at an end of the valve body opposite from the cap member 16 for engaging around the tube 12, and a clamp 20 is shown for forcing the legs 18 into engagement with the tube 12.

The valve body 14 will now be described with reference to FIGS. 2–4. The valve body 14 includes a substantially cylindrical tube receiving portion 22 which defines a central longitudinal axis 24 of the valve 10. The plurality of spaced legs 18 extend from the tube receiving portion 22 at a first end of the valve body 14.

At an opposite second end of the valve body 14 a regulator portion 26 extends from and is formed integrally with the tube receiving portion 22 and includes an annular substantially planar sealing surface 28.

The regulator portion 26 includes spoke portions 30 which are also formed integrally with the tube receiving portion 22 and which extends radially inwardly toward the longitudinal axis 24. An annular hub 32 is supported within the regulator portion 26 and formed integrally with the spoke portions 30.

Figure 2:
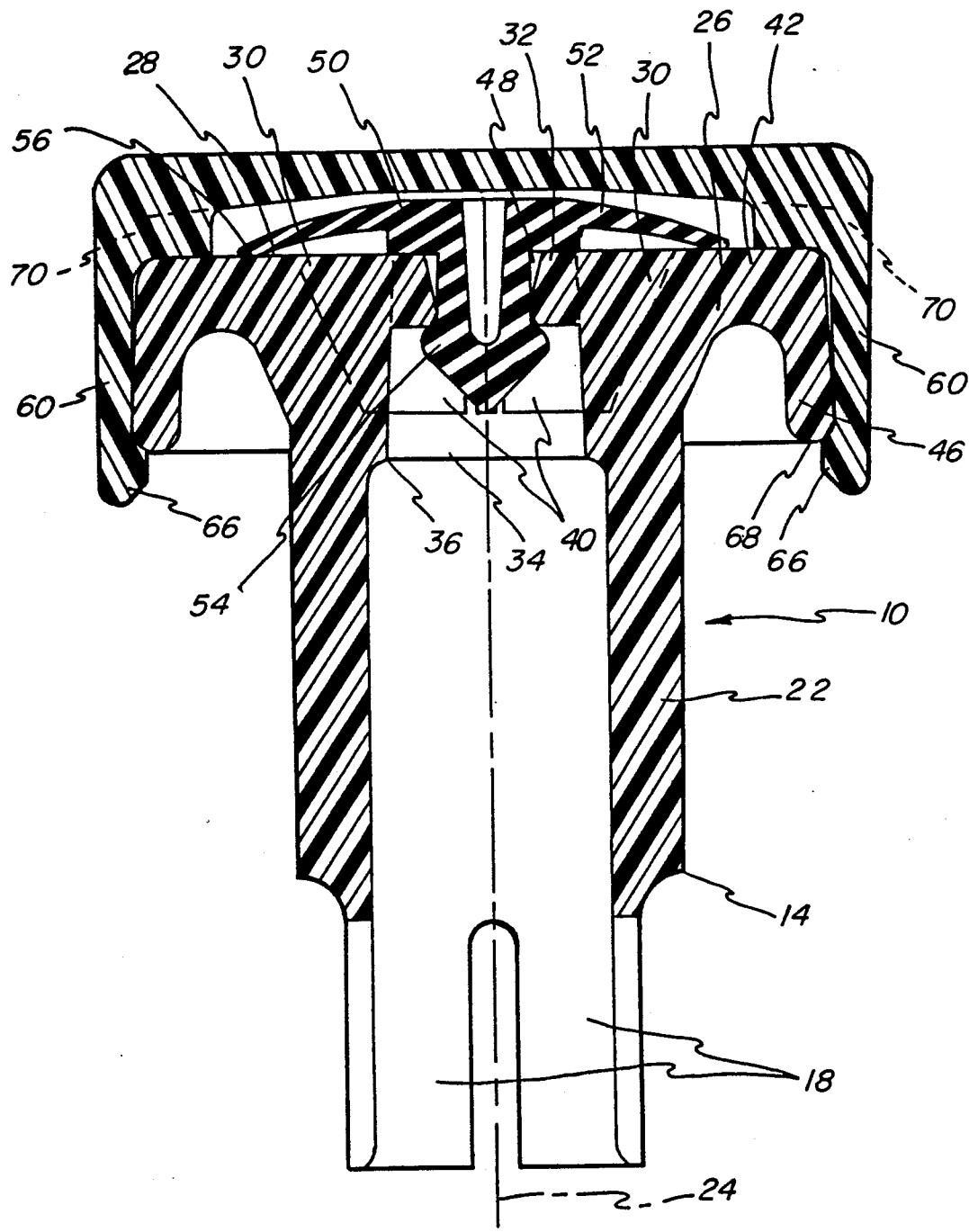
FIG. 2 is an elevational cross-sectional view taken through the center of the valve.
Figure 3:
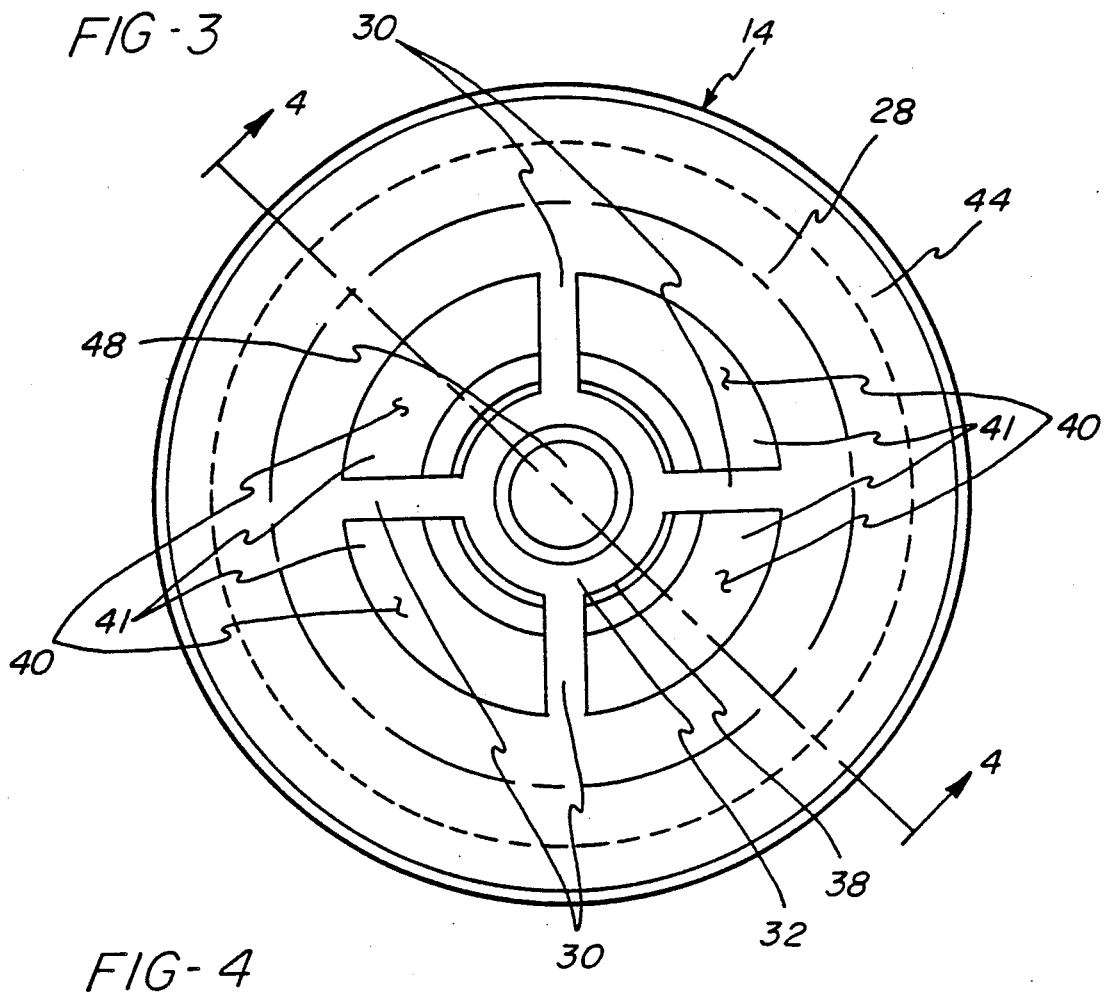
FIG. 3 is a plan view of the valve body with the resilient regulator member and cap member removed.
Figure 4:
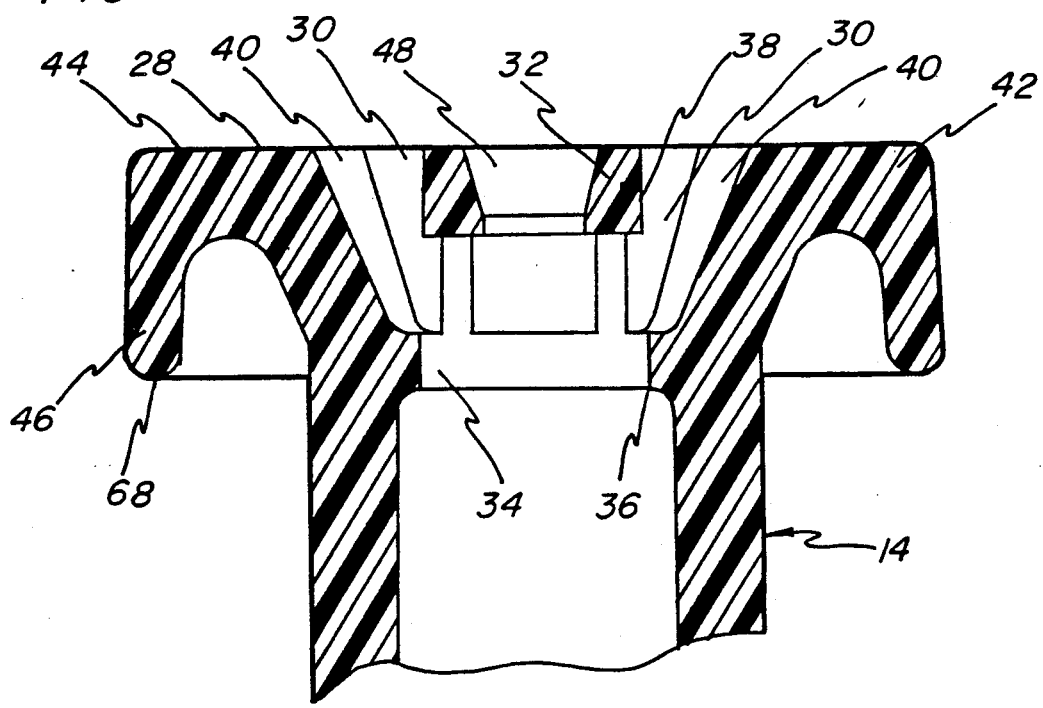
FIG. 4 is a cross-sectional view of an upper portion of the valve body taken along line 4—4 in FIG. 3.

As may be best seen in FIGS. 2 and 4, the spoke portions 30 extend axially from the hub 32 to a point adjacent to the tube receiving portion 22 to form a radially inwardly extending ledge portion 34 for engaging and limiting the inward movement of a tube inserted into the first end of the valve body 14. It should be noted that the spoke portions 30 merge with the ledge portion 34 which includes annular segments extending between adjacent ones of the spoke portions to thereby define an annular ring surface 36 for engaging the ends of tubes inserted into the valve 10. The spoke portions 30, in conjunction with the outer surface 38 of the hub 32 and inner outwardly angled surfaces 40 of the regulator portion 26, define fluid flow passages 41 for permitting fluid flow from the first end of the valve body through the second end.

A flange 42 extends radially outwardly from the annular sealing surface 28 at the second end of the valve 10 and includes a support surface 44 which is substantially coplanar with the sealing surface 28. In addition, the flange includes an annular lip 46 extending substantially parallel to the longitudinal axis 24 from the second to the first end of the valve body 14.

The hub portion is formed with an aperture 48 aligned with the longitudinal axis 24. A resilient unitary valve member 50 is mounted to the hub 32 and includes a disk-shaped radially extending umbrella portion 52 and a stem 54 extending from the umbrella portion 52 through the hub aperture 48. The umbrella portion 52 includes a radially outer surface 56 for engaging the annular surface 28 in sealing contact. The unitary valve member 50 is of conventional umbrella valve construction and, as seen in FIG. 2, is positioned in the valve 10 such that the valve is normally closed to prevent fluid flow.

Figure 5:
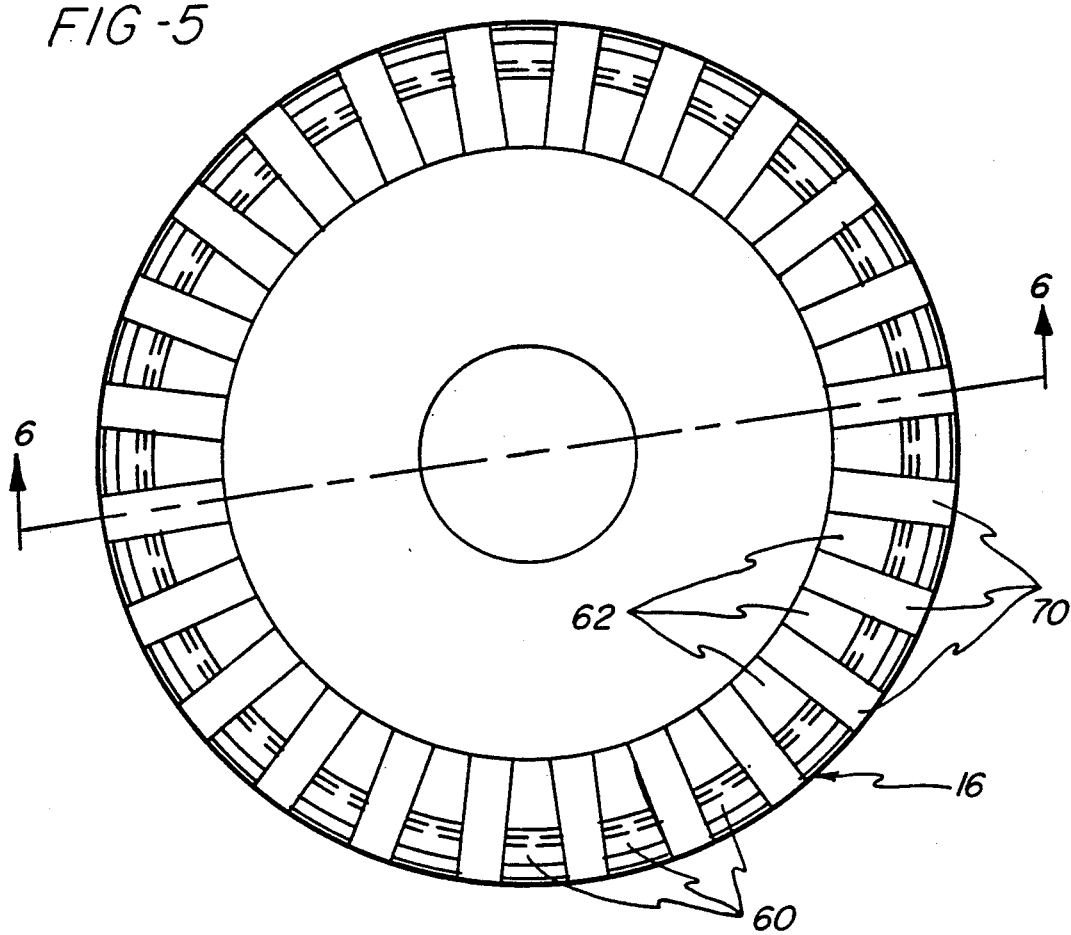
FIG. 5 is a plan view of the interior of the cap member.
Figure 6:
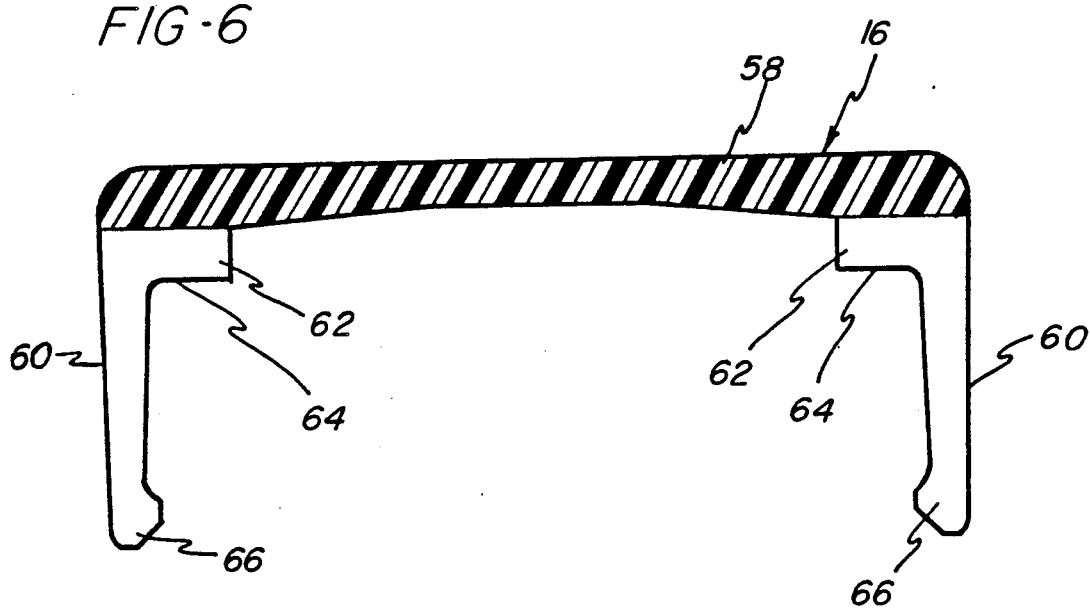
FIG. 6 is a cross-sectional view taken along lines 6—6 in FIG. 5 wherein only two of the finger members are shown extending from the top portion.

The structure of the cap member 16 will be described with reference to FIGS. 2, 5 and 6. The cap member 16 includes a substantially disk-shaped top portion 58 and a plurality of angularly spaced finger members 60 which extend substantially perpendicularly from the top portion 58.

The finger portions each include a support block portion 62 having a block surface 64 for engaging the support surface 44. The support blocks 62 maintain the top portion 58 in spaced relation to the valve member 50 and the sealing surface 28. The finger members 60 further include a radially inwardly extending detent portion 66 for engaging an edge 68 of the annular lip 46 to hold the cap member 16 in position on the valve body 14.

Thus, the support blocks 62 cooperate with the flange support surface 44 to define a fluid flow passage 70 between adjacent ones of the support blocks 62 and between the top portion 58 and the support surface 44 such that fluid flow from the first to the second end of the valve end may pass between the spoke portions 30 to open the valve member 50 and pass radially outwardly from the valve 10 through the radially extending fluid flow passages 70.

The valve body 14 and cap member 16 are preferably formed of a plastic material such that the valve 10 of the present invention provides a durable valve in that the cap member 16 acts as a protective covering surrounding the resilient valve member 50.

In addition, by providing a cap 16 having a plurality of small radiating passages 70, the size of bubbles flowing out of the valve is minimized thereby reducing the noise produced by fluid as it flows out of the valve. Also, the plurality of passages 70 provide sufficient flow area to allow the fluid passing through the resilient valve member 50 to pass through the cap member 16 substantially unrestricted in a plurality of radiating streams.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A valve for controlling fluid flow in a first and a second direction comprising:

a valve body defining a central longitudinal axis of said valve and including a tube receiving first end and a regulator second end located at a longitudinal opposite end of said valve;

said regulator second end including radially inwardly extending spoke portions and a hub portion supported by said spoke portions, said spoke portions defining flow apertures for flow of fluid from said first end of said valve through said second end;

a flow control member including a resilient disk and a stem extending from said disk through said hub portion;

a flange located at a radial outer edge of said regulator second end, said resilient disk engaging said regulator second end adjacent to said flange; and a cap member extending over said resilient disk, said cap member including a substantially disk shaped top portion and a plurality of fingers extending substantially perpendicular to said top portion for engaging said flange and said fingers each including detent means for engaging said flange to hold said cap in engagement with said valve body and surrounding said flow control member, said plurality of fingers defining apertures through which fluid flowing into said first end may flow out of said valve.

2. The valve of claim 1 wherein radially extending fluid passages are defined between adjacent ones of said fingers such that fluid may pass out of said valve between said top portion and said flange through said fluid passages.

3. The valve of claim 2 wherein said fingers include a support block for engaging said flange and positioning said top portion in spaced relation to said regulator second end of said valve body.

4. The valve of claim 1 wherein said resilient disk is formed as a radially extending elastomeric umbrella valve member, said umbrella valve member being biased to a normally closed position.

5. The valve of claim 1 wherein said valve body includes a ledge portion longitudinally spaced from said hub portion, said ledge portion extending radially inwardly from said valve body for engaging and limiting the inward movement of a tube inserted through said first end.

6. The valve of claim 5 wherein said ledge portion is formed as an axial extension of said spoke portions.

7. A valve for controlling fluid flow in a first and a second direction comprising:
- a valve body formed of a plastic material, said valve body including a substantially cylindrical tube receiving portion defining a central longitudinal axis of said valve;
- a plurality of spaced legs extending from said tube receiving portion at a first end of said valve for engaging around a tube inserted into said first end of said valve;
- a regulator portion extending from said tube receiving portion at a second end of said valve and including an annular sealing surface,
- said regulator portion including spoke portions formed integrally with said tube receiving portion and extending radially inwardly toward said longitudinal axis;
- an annular hub supported within said regulator portion by said spoke portions, said spoke portions extending from said hub to a point adjacent to said tube receiving portion to form a radially inwardly extending ledge portion for engaging and limiting the inward movement of a tube inserted into said first end of said valve body;
- a resilient unitary valve member including a support stem extending through said hub and a resilient radially extending umbrella portion having a radially outer surface engaging said annular surface in sealing contact;
- a flange extending radially outwardly from said annular sealing surface at said second end of said valve, said flange including a support surface coplanar with said sealing surface and an annular lip extending substantially parallel to said longitudinal axis from said second to said first end of said valve;
- a cap member attached to said valve body, said cap member including a disk shaped top portion and a plurality of angularly spaced finger members extending substantially perpendicularly from said top portion, said finger members each including a support block engaging said support surface for maintaining said top portion in spaced relation to said valve member and said sealing surface, said finger members further including a radially inwardly extending detent portion for engaging an edge of said annular lip to hold said cap member in position on said valve body;
- wherein a radially extending fluid flow space is defined between adjacent ones of said support blocks and between said top portion and said support surface such that fluid flow from said first to said second end may pass between said spoke portions to open said valve member and pass radially outwardly from said valve through said radially extending fluid flow spaces.

8. A valve for controlling fluid flow in a first and a second direction comprising:
- a valve body defining a tube receiving first end and a regulator second end;
- said regulator second end including radially inwardly extending spoke portions and a hub portion supported by said spoke portions, said spoke portions defining flow apertures for flow of fluid from said first end of said valve through said second end;
- a flow control member including a resilient disk and a stem extending from said disk through said hub portion;
- a flange located at a radial outer edge of said regulator second end, said resilient disk engaging said regulator second end adjacent to said flange;
- a cap member surrounding said flow control member and including a substantially disk shaped top portion; and
- a plurality of fingers extending substantially perpendicular to said disk shaped top portion between said top portion and said flange and defining a plurality of apertures through which fluid flowing into said first end may flow out of said valve.

9. The valve of claim 8 wherein radially extending fluid passages are defined by said fingers for permitting flow of fluid radially out of said valve.

10. The valve of claim 8 wherein said valve body includes a ledge portion longitudinally spaced from said hub portion, said ledge portion extending radially inwardly from said valve body for engaging and limiting the inward movement of a tube inserted through said first end.

11. The valve of claim 10 wherein said ledge portion is formed as an axial extension of said spoke portions.

12. The valve of claim 8 wherein said fingers are formed integrally with said cap member.

* * * * *